United States Patent
Kang (10) Patent No.: US 7,277,390 B2
(45) Date of Patent: Oct. 2, 2007

(54) TCP PROCESSING APPARATUS OF BASE TRANSCEIVER SUBSYSTEM IN WIRED/WIRELESS INTEGRATED NETWORK AND METHOD THEREOF

(75) Inventor: Chul-Hee Kang, Kyunggi-Do (KR)

(73) Assignee: LG Nortel, Co., Ltd., Seoul (KR)

( * ) Notice: Subject to any disclaimer, the term of this patent is extended or adjusted under 35 U.S.C. 154(b) by 1033 days.

(21) Appl. No.: 10/319,500

(22) Filed: Dec. 16, 2002

(65) Prior Publication Data

US 2003/0117974 A1   Jun. 26, 2003

(30) Foreign Application Priority Data

Dec. 26, 2001  (KR) ...................... 10-2001-0085422

(51) Int. Cl.
*H04L 12/26* (2006.01)
(52) U.S. Cl. ...................... 370/231; 370/235; 370/349
(58) Field of Classification Search ................ 370/231, 370/235, 349
See application file for complete search history.

(56) References Cited

U.S. PATENT DOCUMENTS

| | | | |
|---|---|---|---|
| 6,208,620 B1 * | 3/2001 | Sen et al. ................. | 370/231 |
| 6,553,032 B1 * | 4/2003 | Farley et al. ............... | 370/394 |
| 2002/0106991 A1 * | 8/2002 | Foore et al. ................. | 455/70 |
| 2003/0086407 A1 * | 5/2003 | Bhatt et al. ................. | 370/345 |

* cited by examiner

*Primary Examiner*—Brian Nguyen
(74) *Attorney, Agent, or Firm*—Ked & Associates, LLP (57) ABSTRACT

A protocol processing apparatus and method in a mobile communication system operates a transmitting end according to whether transmission errors occur in a wireless section in consideration of conditions of the wireless section. A TCP processing apparatus and method of a base transceiver subsystem (BTS) in a mobile communication system can operate a TCP sending end in a persist or congestion override mode by setting a window size of the TCP sending end as '0' if an Ack is not arrived from a TPC receiving end for a round trip time of a wireless link. Preferred embodiments of the present invention can reduce or prevent TCP performance degradation caused by congestion avoidance and control by preventing the TCP sending end from performing congestion avoidance and control by packet loss in the wireless link section. Also, the BTS updates the round trip time (RTT) of the wireless link when the Ack is arrived from the TCP receiving end for the RTT of the wireless link. Preferred embodiments can retransmit the packets to the TCP receiving end if packets that belong to the same window of the arrived Ack exist in the cache, thus to swiftly perform retransmission.

14 Claims, 7 Drawing Sheets

TCP PROCESSING APPARATUS OF BASE TRANSCEIVER SUBSYSTEM IN WIRED/WIRELESS INTEGRATED NETWORK AND METHOD THEREOF

BACKGROUND OF THE INVENTION

1. Field of the Invention

The present invention relates to a wired/wireless integrated network and method thereof, and more particularly, to a TCP processing apparatus and method thereof.

2. Background of the Related Art

Currently, TCP is the most commonly used protocol in the Internet, and is a protocol that was developed on the basis of a stable wired environment. The TCP protocol determines that congestion occurs in the network when a timeout is generated because of an Acknowledge packet (hereafter "Ack") or when a sending end receives a duplicate Ack, which means loss of a data packet, and performs congestion control to relieve congestion of the network and reduce loss of the data packet. That is, the TCP protocol determines that the reason of the loss of the transmitted packet was congestion of the network, and accordingly, the TCP protocol has been improved to reduce loss of packets by controlling congestion.

As the Internet develops, a requirement for using the Internet through a wireless network regardless of a region where a user is located or movement of the user has been increased. However, since a wireless network gains a higher error rate than that of a wired network by fading and noise, packet loss is common, and disconnection frequently occurs.

When the related art TCP protocol is directly applied to the wireless network, the TCP protocol determines that the packet loss occurs in the wireless environment because of congestion, and performs congestion control. Therefore, the TCP protocol unnecessarily lowers a transmission speed and wastes a bandwidth of a link because of repeated packet loss to reduce performance of the whole network.

Further, the related art TCP processing apparatus of a communication system is limited to prevent retransmission timeout of a transceiving end section in a wired end that is a packet sending end because a fixed retransmission time is used. Therefore, at the wired end, there occurred a timeout for retransmission in the transceiving end section, and by the timeout, the wired end performs retransmission. At this time, the transmission section ranges from the wired end to a mobile terminal or user, and accordingly, the retransmission section is lengthened, thus to degrade the TCP performance.

When occurrence of retransmission timeout becomes frequent, the TCP of the wired end performs congestion avoidance and control, and continuously increases retransmission time. Therefore, the TCP processing apparatus of the related art BTS could not perform retransmission for a long time and degrades performance of the TCP. Accordingly, there is a need to efficiently use the TCP protocol in the wireless network.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a packet processing apparatus and method thereof in a mobile communication system that includes a wired/wireless integrated network.

Another object of the present invention is to provide a TCP processing apparatus of a subsystem in a wired/wireless integrated network and method thereof that can reduce a number of timeouts in the network such as in a wired end, which is a TCP sending end.

Another object of the present invention is to provide a TCP processing apparatus of a base transceiver subsystem in a wired/wireless integrated network and method thereof that can reduce a number of timeouts in a wired end, which is a TCP sending end caused by disconnection in a wireless section, instability of a channel and the like.

Another object of the present invention is to provide a TCP processing apparatus of a base transceiver subsystem in a wired/wireless integrated network and method thereof that can set a retransmission time according to change of a wireless environment.

Another object of the present invention is to provide a TCP processing apparatus of a base transceiver subsystem in a wired/wireless integrated network and method thereof that can set a retransmission time according to change of a wireless environment by using a round trip time (RTT) of the wireless link as the retransmission time of the wireless section by a base transceiver subsystem (BTS) and updating an RTT of the wireless link when an acknowledge message is received from a TCP receiving end.

Another object of the present invention is to provide a TCP processing apparatus of a base transceiver subsystem in a wired/wireless integrated network and method thereof that can perform faster retransmission.

Another object of the present invention is to provide a TCP processing apparatus of a base transceiver subsystem in a wired/wireless integrated network and method thereof that can perform retransmission and receive a plurality of acknowledgement messages from a mobile terminal or end user.

Another object of the present invention is to provide a TCP processing apparatus of a base transceiver subsystem in a wired/wireless integrated network and method thereof that can perform retransmission and receive a plurality of acknowledgement messages from a mobile terminal or end user by receiving the one acknowledgement message and retransmitting packets to the mobile terminal or end user, which is a TCP receiving end, based on the packets that belong to a same window.

To achieve at least the above objects and other advantages in a whole or in part and in accordance with the purpose of the present invention, as embodied and broadly described herein, there is provided a TCP processing apparatus of a wired/wireless integrated network that includes a packet processing unit configured to process a data packet received from a TCP sending end for transmission to a TCP receiving end, a storage unit configured to store the packet received by the packet processing unit, a timer configured to check retransmission time of a wireless section according to a performance characteristic of the wireless section for each packet, and a mode processing unit configured to set the TCP sending end as a persist mode if an acknowledge signal for the packet is not received from a TCP receiving end during the retransmission time of the wireless section.

To further achieve these and other advantages and in accordance with the purpose of the present invention, as embodied and broadly described herein, there is provided a TCP processing method of a subsystem in a wired/wireless integrated network that includes processing a data packet received to the subsystem from a TCP sending end, and operating the TCP sending end in a congestion override mode if an error in transmission of the data packet to a TCP receiving end occurs in a wireless section of the network.

To further achieve these and other advantages and in accordance with the purpose of the present invention, as embodied and broadly described herein, there is provided a TCP/IP protocol in a wired/wireless integrated network that includes a physical layer, a link layer, a K-SNOOP layer configured to force operation of a TCP sending end in a second mode if an acknowledge signal packet for a data packet is not received from a TCP receiving end within a retransmission time of a wireless section set on the basis of a wireless link, and a network layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Preferred embodiments of an apparatus and method for using same use the TCP protocol in a communication system that includes a wired/wireless network preferably by modifying it appropriately to characteristics of the wireless network. Preferred embodiments of a method and apparatus for overcoming performance degradation of the TCP in the integrated network can use a link level retransmission scheme.

Figure 1:
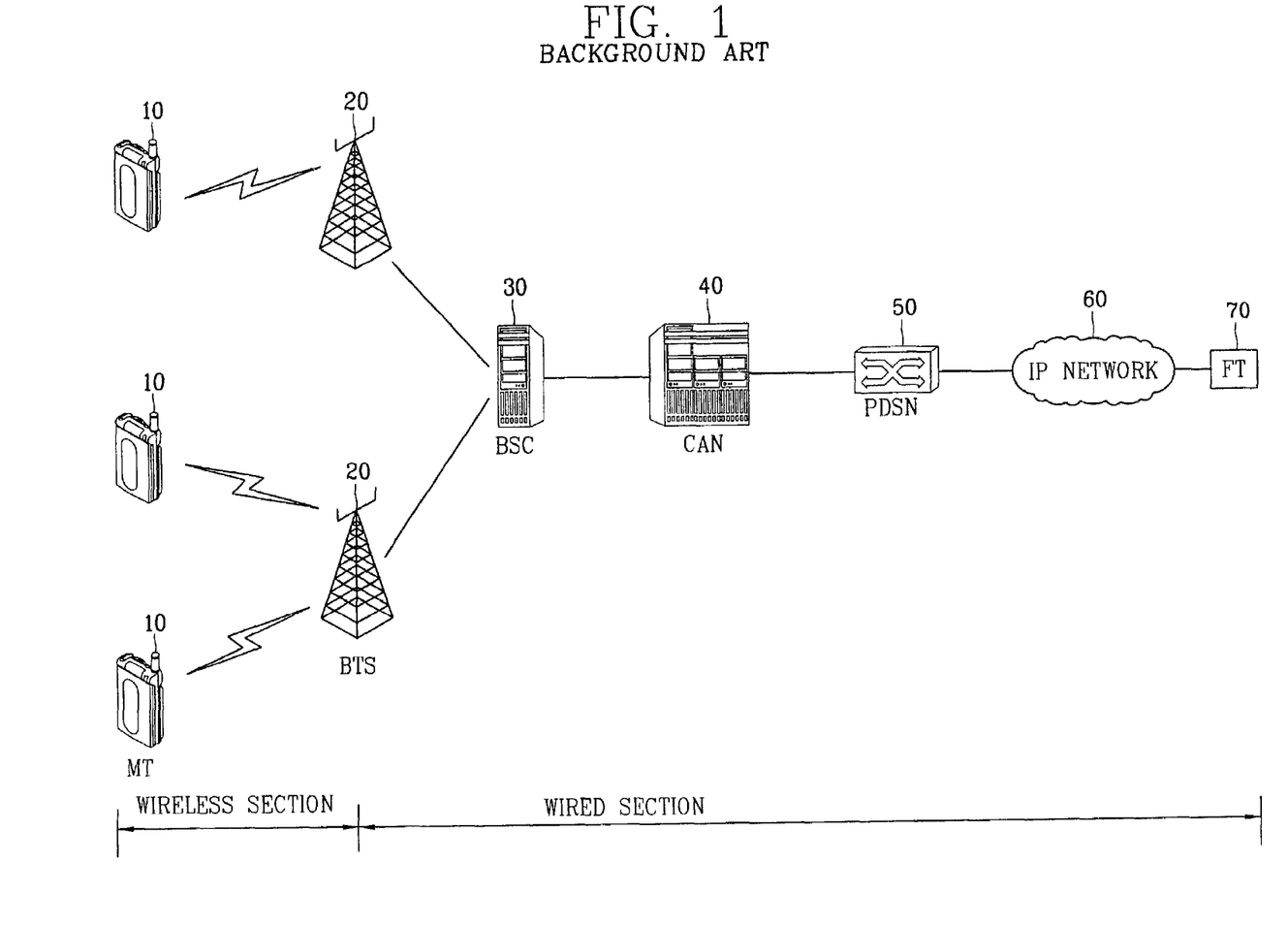
FIG. 1 is a diagram that shows an exemplary structure of a mobile communication system with an integrated network of wired/wireless networks.

A SNOOP protocol in an integrated network can divide the TCP connection into a wired region and wireless region having a link level retransmission method. FIG. 1 is a diagram that shows an exemplary embodiment of a structure of a mobile communication system with an integrated network of wired/wireless networks.

As shown in FIG. 1, the mobile communication system with integrated network of the wired/wireless networks can include a mobile terminal 10 for providing a mobile communication service for a mobile communication, a base transceiver subsystem (BTS) 20 for performing wireless communication with the MT 10, and a base station controller (BSC) 30 that can be wired-connected with the BTS 20 preferably for controlling the BTS 20. A controller area network (CAN) 40 connected with the BSC 30 is for performing data multiplex communication, a packet data serving node (PDSN) 50 is for connecting a wireless signal from the mobile communication subscriber to an IP network 60, and a fixed terminal (FT) 70 is coupled to the IP network 60. The SNOOP protocol preferably exists in the BTS 20, and monitors a packet that passes through a TCP connection.

Figure 2:
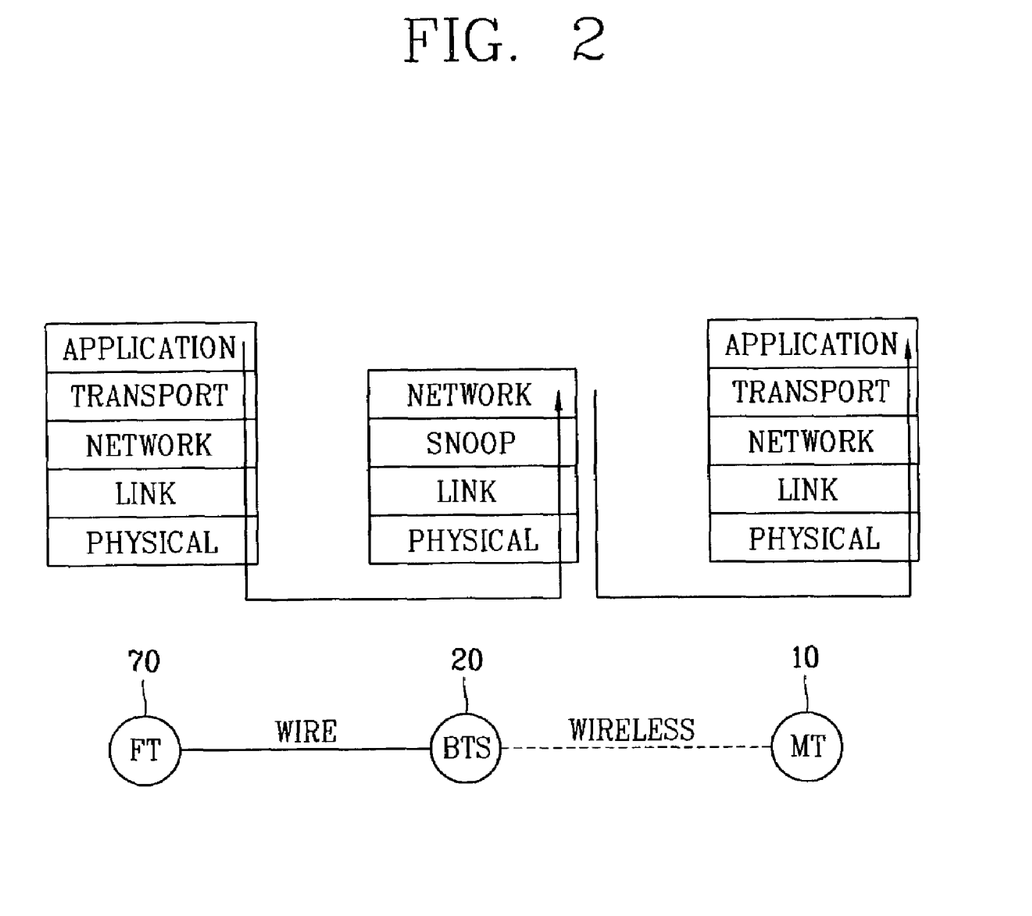
FIG. 2 is a diagram that shows an exemplary structure of a TCP/IP protocol to which a SNOOP protocol is applied.

FIG. 2 is a diagram that shows an exemplary structure of a TCP/IP protocol to which the SNOOP protocol is applied. The description of a physical layer, link layer, network layer, transport layer and application layer will be omitted here since the layers perform functions of respective protocol layers.

If the BTS 20 stores packets received from the end of the wired network (e.g., FT 70) in a cache to perform link level retransmission, and receives an Ack from the MT 10, the SNOOP discards packets stored in the meantime. In case the packets are lost in the wireless section (e.g., a duplicate Ack is received or a timeout is generated), and the lost packet is stored in the cache, the SNOOP retransmits the packet to the MT 10. Therefore, the SNOOP can prevent the duplicate Ack from being transmitted to the wired end by retransmitting the lost packet in the wireless section.

The TCP processing apparatus of the BTS in the wired/wireless integrated network using such SNOOP includes a packet processing unit for transmitting a data packet from a wired end to a mobile terminal and an Ack processing unit for processing the Ack, which is transported from the mobile terminal to the wired end, and transmitting the Ack to the mobile terminal.

Operations of the TCP processing apparatus of the BTS in the wired/wireless integrated network for the case that the sending end is a wired end and the TCP receiving end is the mobile end will now be described. The description of the operation for the case that the TCP sending end is the mobile terminal and the TCP receiving end is the wired end will be omitted.

Figure 3:
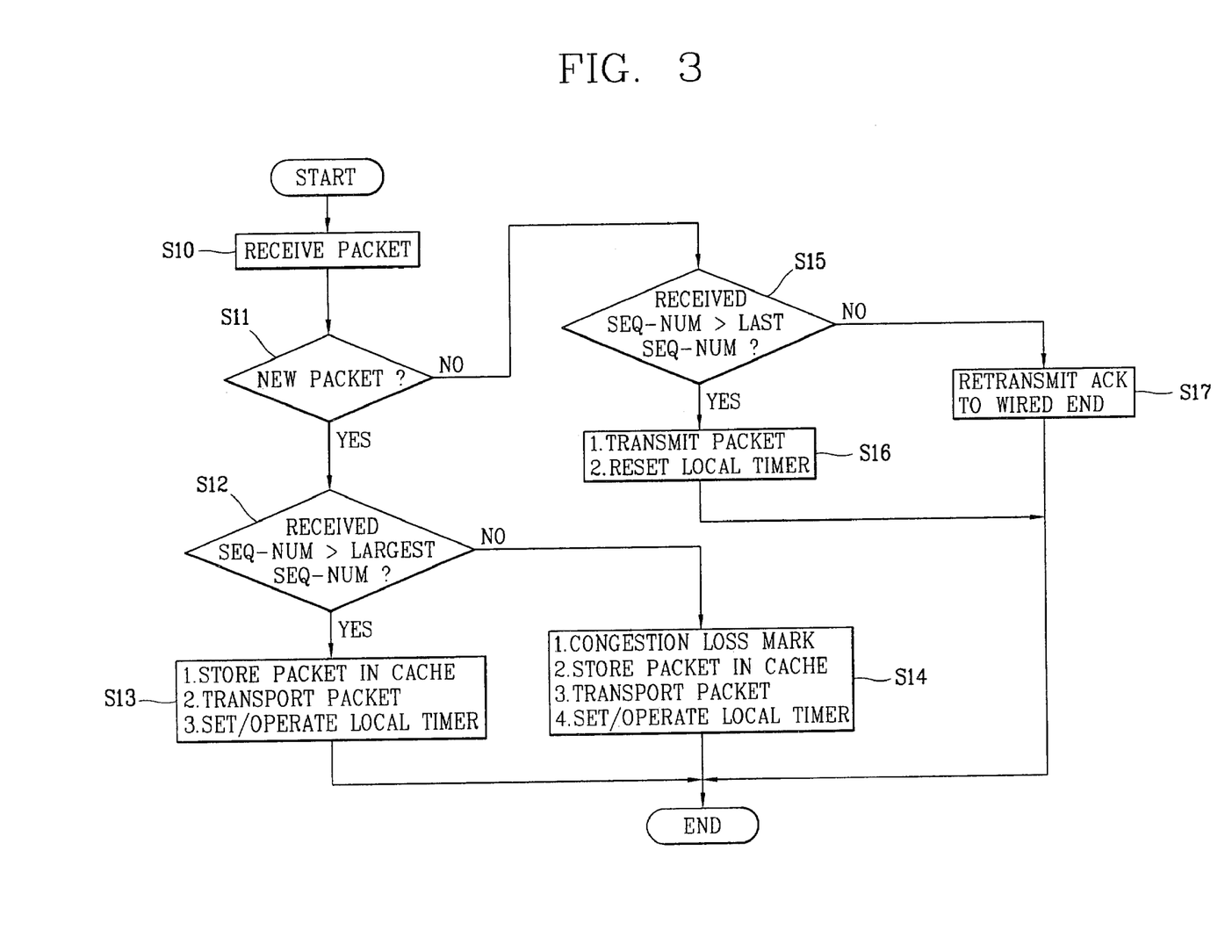
FIG. 3 is a flow chart illustrating operations of a packet processing unit of a SNOOP protocol.

Operations of the packet of the TCP processing apparatus of the BTS of FIG. 2 in the wired/wireless integrated network will now be described. FIG. 3 is a flow chart illustrating operations of a packet processing unit of the SNOOP.

As shown in FIG. 3, in a case where new packets with a correct order, which are not in the cache are received, the packet processing unit preferably stores the received packets to the cache, transmits them to the MT 10 and at the same time, sets a local timer (steps S10-13). The local timer is set to check timeout for retransmission in the wireless section.

However, when new packets with incorrect sequential numbers, which are not lost in the cache are received, the packet processing unit preferably determines that the segment is lost or does not arrive in order by congestion of the wired network, records the congestion state, stores the new packets in the cache, and transmits the packets to the MT 10. Also, the local timer is set (steps S10-S12 and S14).

On the other hand, when the packet already stored in the cache are received again, the packet processing unit compares the sequential numbers of the arrived packets and the sequential number of the last Ack sent to the wired end (steps S10, S11 and S15). If the sequential number of the packets that were retransmitted is larger than the sequential number of the last Ack, which was sent to the wired end, the packet processing unit determines that the packet that was received again was not transported to the MT 10, stores the packets in the cache again, transmits the packets to the MT 10, and resets the local timer (step S16).

If the sequential number of the packets, which were retransmitted, is not larger than the sequential number of the last Ack that was sent to the wired end, the packet processing unit determines that the packet that was received again was received by the MT 10, but the packet processing unit could not receive the Ack from the MT 10, and retransmits the last Ack to the wired end (step S17).

Figure 4:
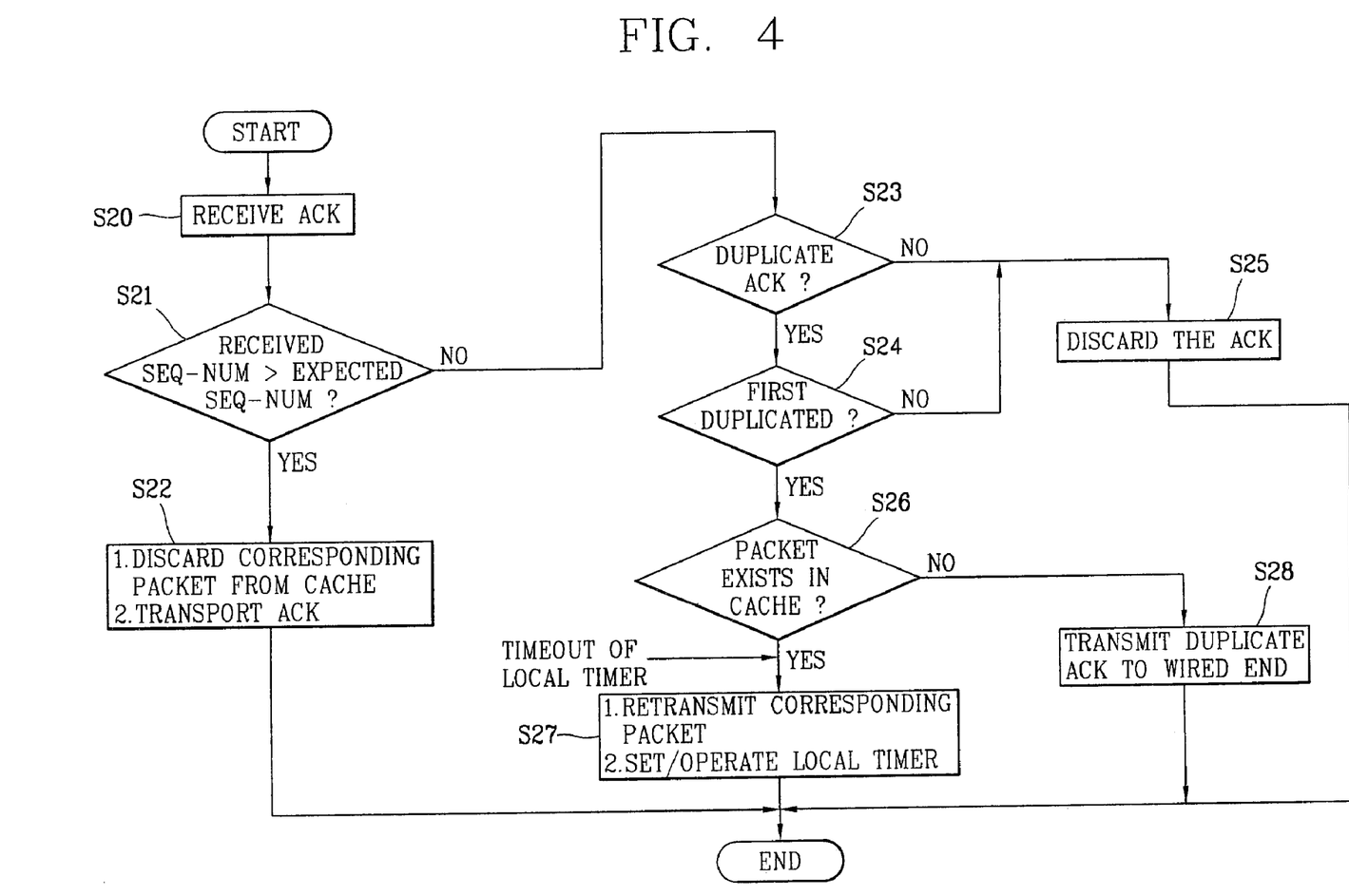
FIG. 4 is a flow chart illustrating operations of an acknowledge processing unit of a SNOOP protocol.

Operations of an Ack processing unit of the TCP processing apparatus of the BTS of FIG. 2 in the wired/wireless integrated network of FIG. 2 will now be described. FIG. 4 is a flow chart illustrating operations of an Ack processing unit of the SNOOP.

As shown in FIG. 4, in a case where a new Ack is received, the Ack processing unit of the SNOOP compares the sequential number of the received Ack and an expected sequential number of the Ack.

If the sequential number of the received Ack is larger than the sequential number of the expected Ack, the Ack processing unit deletes the corresponding packet stored in the cache, and transmits the received Ack to the wired end (steps S20, S21 and S22).

However, if the received Ack is not larger than the sequential number of the expected Ack, that is, if the received Ack is a duplicate Ack, which was already received (step S23), the Ack processing unit checks whether the received Ack is the first received duplicate Ack (step S24).

If the received Ack is the first received duplicate Ack, the Ack processing unit checks whether the received Ack packet is stored in the cache. If the received Ack packet is stored in the cache, the Ack processing unit determines that the corresponding packet was lost in the wireless section, retransmits the corresponding packet to the MT10, and sets the local timer (steps S26 and S27). However, if the arrived Ack packet is not stored in the cache, the Ack processing unit determines that the corresponding packet was lost in the wired section (wired network), and transmits the arrived duplicate Ack to the wired end (step S28).

In the step S23, if the received Ack is not a duplicate Ack, the Ack processing unit discards the arrived Ack (step S25). Also, in the step S24, if the arrived Ack is not the first received duplicate Ack, the Ack processing unit preferably discards the arrived Ack (step S25).

On the other hand, the Ack processing unit of the SNOOP checks the local timer that has been set in each corresponding packet in the packet processing unit. When the corresponding local timer is timed out, the Ack processing unit preferably performs the step S27. That is, the Ack processing unit transmits the timed-out corresponding packet to the MT 10 and resets the local timer (step S27).

As described above, the SNOOP preferably retransmits the corresponding packet to the MT by itself if a duplicate Ack is arrived from the MT or a retransmission timeout is occurred. However, since the TCP protocol uses a delayed Ack, the number of the Ack received by the SNOOP by the delayed Ack can become small when there is continuous loss of packets because of the characteristic of the wireless environment. The TCP processing apparatus using such a SNOOP could not retransmit all of plurality of pluralities of packets lost in the wireless section.

Also, the local timer of the wireless section in the TCP processing apparatus of the BTS checks a uniformly fixed retransmission time without consideration of transcient wireless environment. Accordingly, the TCP processing apparatus of the BTS performed retransmission after waiting for an unnecessarily long time even when retransmission of the wireless section was required. Also, the TCP processing apparatus of the BTS using the SNOOP caused serious degradation of TCP performance in a case where there were many lost packets by a momentary disconnection because of hand-off of the mobile terminal.

Preferred embodiments according to the present invention include a TCP/IP protocol (e.g., of a subsystem such as a base transceiver subsystem (BTS) or the like) having an additional K-SNOOP layer that is not a SNOOP layer preferably among the exemplary protocols shown in FIG. 2. The K-SNOOP can function as a upper layer of the link layer among the 'T' CP/IP protocol of the BTS. Therefore, the TCP/IP protocol of the BTS can include a physical layer, link layer, K-SNOOP layer 100 and network layer.

The K-SNOOP preferably sets the retransmission time of a wireless section according to changing condition of the wireless section. The K-SNOOP preferably sets the retransmission time using an RTT of a wireless link so that data packet retransmission can be suitably performed. Also, the K-SNOOP can have a function for coercively operating a wired end, which is a TCP/IP sending end, in a separate mode such as a persist mode if an Ack packet for a data packet is not arrived from a mobile terminal, which is a TCP receiving end, in a retransmission time of the wireless section set on the basis of the RTT of the wireless link.

Figure 5:
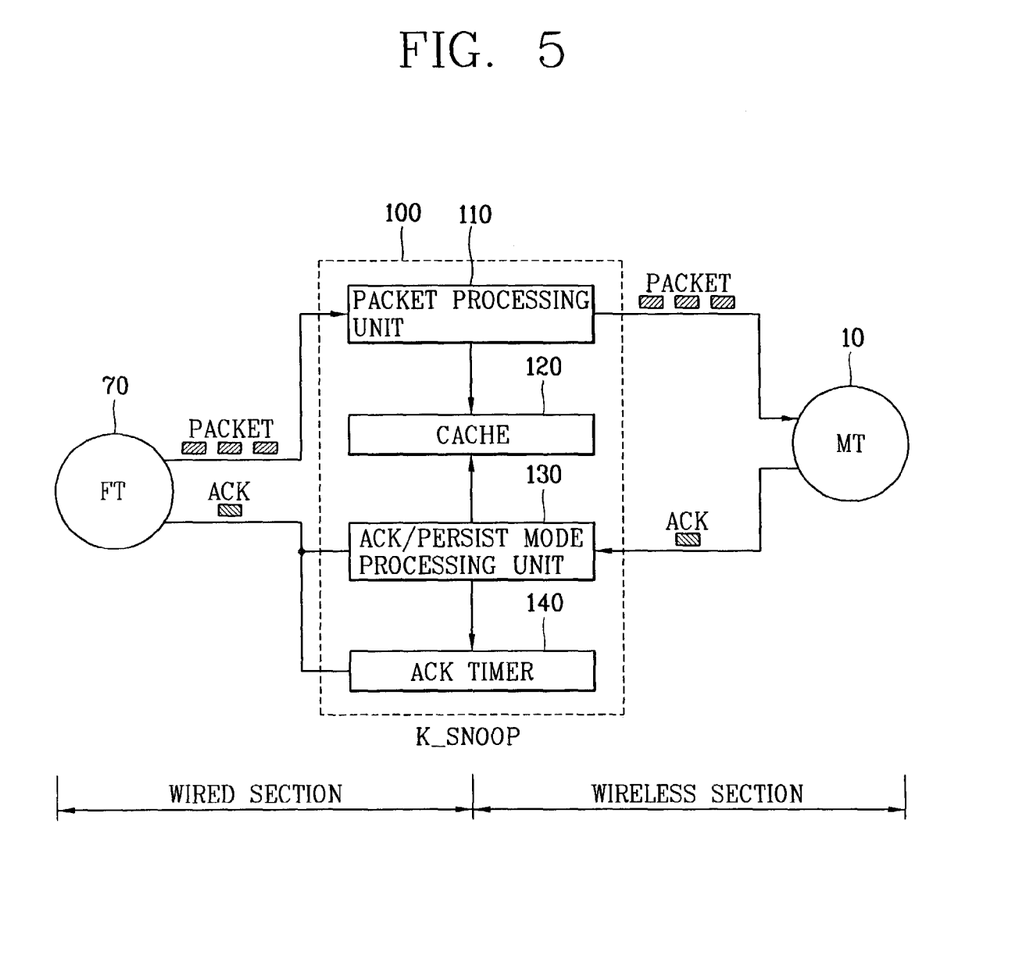
FIG. 5 is a diagram showing a preferred embodiment of a TCP processing apparatus of a subsystem using a K-SNOOP in a wired/wireless integrated network in accordance with the present invention.

FIG. 5 is a diagram that shows a preferred embodiment of a TCP processing apparatus according to the present invention. As shown in FIG. 5, a TCP processing apparatus can include a base station controller using a K-SNOOP in a wired/wireless integrated network in accordance with the present invention. However, the present invention is not intended to be so limited to locate the K-SNOOP protocol/layer or functions.

As shown in FIG. 5, the TCP processing apparatus of the BTS in a wired/wireless integrated network preferably includes a packet processing unit 110 for processing a data packet that is received from a TCP sending end (e.g., a FT 70) to the BTS, and a cache 120 for storing the packet received to the packet processing unit 110. An Ack timer 140 can check retransmission time of a wireless section preferably based on a round trip time of the wireless link for each packet, and an Ack/persist mode processing unit 130 can compulsorily set the TCP sending end in a persist mode or the like if the Ack for the packet is not received from the TCP receiving end (e.g., a MT 10) for a retransmission time of the wireless section.

A duplicate Ack preferably includes information for setting a window size as '0' and the FT 70 is operated or switched to operate in the persist mode by setting the window size as '0' according to the duplicate Ack. However, the present invention is not intended to be so limited.

Operations of the TCP processing apparatus of FIG. 5 of the BTS in the wired/wireless integrated network will now be described. Operations when the TCP sending end is the wired end and TCP receiving end is the mobile terminal will be described. However, a description in a case where the TCP sending end is a mobile terminal and TCP receiving end is the wired end will be omitted.

Since the packet processing unit 110 is preferably operated similar to operations of the packet processing unit of the TCP processing apparatus of FIG. 3, only different operations will be described here.

The packet processing unit 110 can set an Ack timer when the packet received from the FT 70 is sent to the MT 10. Then, the Ack/persist mode processing unit 130 preferably deletes packets that were checked to determine if they were received, sends the received Ack to the FT 70, and measures the retransmission time of the wireless section (i.e., a characteristic) by calculating the RTT to swiftly adapt to wireless link environment.

Figure 6:
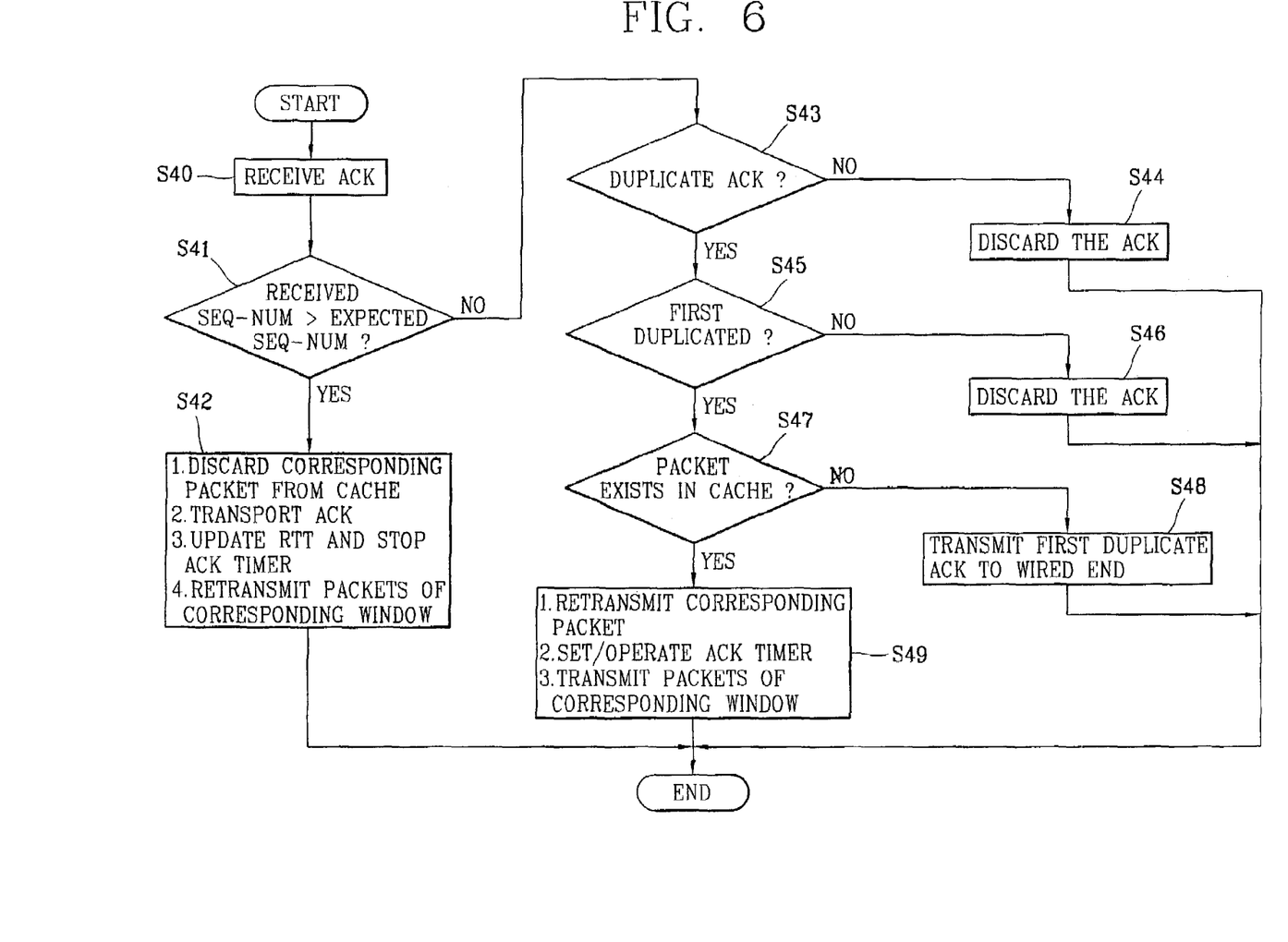
FIG. 6 is a flowchart showing a preferred embodiment of a method for processing an acknowledge packet of a TCP processing apparatus in accordance with the present invention.

FIG. 6 shows a preferred embodiment of a method for processing an Ack of a TCP processing apparatus of an integrated network of wired/wireless networks according to the present invention. The method of FIG. 6 will be described with reference to the TCP processing apparatus of FIG. 5. However, the present invention is not intended to be so limited.

As shown in FIG. 6, when a new Ack is arrived (e.g., received) from MT 10 (step S40), the Ack processing unit 130 preferably compares the sequential number of the arrived (e.g., received) Ack and the sequential number of an expected Ack (step S41).

In a case where the sequential number of the arrived Ack is larger than the sequential number of an expected Ack, the Ack/persist mode processing unit can delete the packet corresponding to the arrived Ack from the cache 120 and send the arrived Ack to the FT 70. At this time, the Ack/persist mode processing unit 130 preferably resets the retransmission time of the wireless section by calculating the RTT of the packet (e.g., the deleted packet) corresponding to the arrived Ack, and cancels the Ack timer 120 that was set for the packet corresponding to the arrived Ack. Also, the Ack/persist mode processing unit 130 can retransmit remaining packets to the MT 10 if there are remaining packets by checking whether packets that belong to the same widow of the packet remain. Therefore, the Ack/persist mode processing unit 130 can increase a number of the Ack, which can be received from the wireless section (e.g., the MT 10), and accordingly, the retransmission section of the packet can become a section between a BTS 20 and MT10 as shown in FIG. 1.

On the other hand, if the sequential number of the arrived Ack is not larger than the sequential number of an expected Ack, the Ack/persist mode 130 processing unit preferably checks whether the arrived Ack is a duplicate Ack of the previously received Ack (step S43).

If it is not a duplicate Ack, the Ack/persist mode processing unit 130 can discard the arrived Ack (step S44). If the arrived Ack is a duplicate Ack, the Ack/persist mode processing unit 130 can check whether the arrived Ack is a first duplicate arrived Ack (step S45).

If the arrived Ack is a duplicate Ack, that is, the arrived Ack is an expected duplicate Ack, the Ack/persist mode processing unit 130 preferably discards the arrived duplicate (step S46). Then, the Ack/persist mode processing unit 130 can correctly block the duplicate Ack from being transmitted to the FT 70 under the wireless environment.

However, if the arrived Ack is a first duplicate arrived Ack, the Ack/persist mode processing unit 130 preferably checks whether the packet of the arrived Ack exists in the cache 120 (step S47). If the arrived Ack does not exist in the cache, the Ack/persist mode processing unit 130 preferably determines that the packet was lost in the wired network, and transmits the duplicate Ack, which was first arrived to the FT 70 (step S48). The first duplicate Ack is identical as the earlier described duplicate Ack, and can be called as a normal duplicate Ack.

However, if the arrived Ack exists in the cache, the Ack/persist mode processing unit 130 preferably determines that the arrived packet was lost in the wireless network, retransmits the Ack to the FT 70 and deletes the packet from the cache (step S49). The Ack/persist mode processing unit 130 resets the Ack timer 140. Also, the Ack/persist mode processing unit can check whether the packets, which belong to the window of the retransmitted packet exist in the cache 120, and retransmits the packets to the MT 10 if the packets exist in the cache 120 (step S49).

Figure 7:
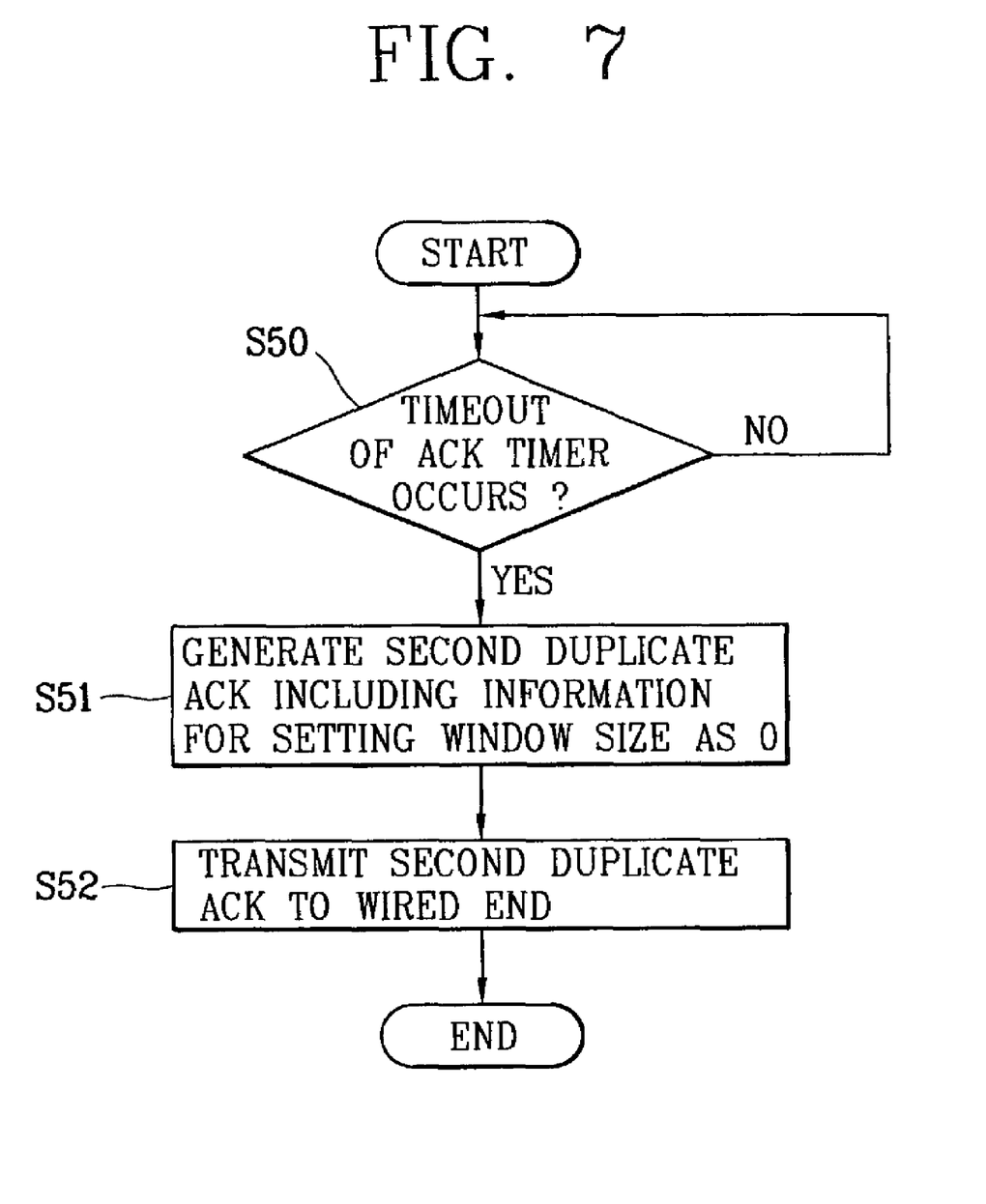
FIG. 7 is a flowchart showing a preferred embodiment of a method for generating a duplicate acknowledge message for setting a persist mode of a TCP processing apparatus in accordance with the present invention.

On the other hand, when the Ack timer 140 is timed out (step S50), the Ack/persist mode processing unit 130 preferably generates a second duplicate Ack as shown in FIG. 7. The sequential number of the second duplicate Ack can have a value the same as the largest sequential number of the Ack, which was received from the MT 10. Also, there is a field for recording a value for setting the window size in the header of the second duplicate Ack, and the Ack/persist mode processing unit 130 preferably records the value for setting the window size as '0' in the field (step S51).

The Ack/persist mode processing unit 130 sends the generated second duplicate Ack to the FT 70 (step S52). The Ft 70 operates in the persist mode by setting the window size as '0' on the basis of the value of the field value for setting the window size.

The FT 70 that operates in the persist mode preferably does not generate congestion avoidance and control. Therefore, for example, the timeout value is not exponentially increased and the FT 70 can send packets with an increased or maximum transmission rate by opening the window to an increased or maximum size when a new Ack is received.

As described above, preferred embodiments of a TCP processing apparatus of a BTS in a wired/wireless integrated network can set the retransmission time of the wireless section suitably according to the change of wireless environment by updating a characteristic such as the retransmission time of the wireless section by calculating the RTT of the wireless link with the BTS, which can be a boundary point between the wired and wireless networks, when a new Ack of the packet is received from the TCP receiving end.

In addition, preferred embodiments according to the present invention can prevent TCP performance degradation caused by congestion avoidance and control by preventing the TCP sending end from performing congestion avoidance and control by packet loss in the wireless link section, since the preferred embodiments can determine there occurs an unexpected delay or loss in the wireless link section if the Ack is not arrived during the RTT of the wireless link. Such congestion control can be performed by operating the TCP sending end or the like in a persist mode preferably by setting the window size as '0' of the TCP sending end.

Also, preferred embodiments of the present invention preferably can delete packets, which are checked to determine that they are received, from the cache when the Ack is transmitted from the TCP receiving end to the BTS, and retransmits the packets to the mobil terminal, which is the TCP receiving end, if there are remaining packets that belong to the same window. Accordingly, swift retransmission can be performed or a plurality of Acks can be received from the mobile terminal.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A TCP processing apparatus of a wired/wireless integrated network, comprising:
a packet processing unit configured to process a data packet received from a TCP sending end for transmission to a TCP receiving end;
a storage unit configured to store the packet received by the packet processing unit;
a timer configured to check retransmission time of a wireless section according to a performance characteristic of the wireless section for each packet, wherein the performance characteristic comprises a round trip time of a wireless link; and
a mode processing unit configured to set the TCP sending end in a persist mode if an acknowledge signal for the packet is not received from the TCP receiving end during the retransmission time of the wireless section, and to update the retransmission time of the wireless section based on the round trip time of the wireless link, wherein the mode processing unit generates a duplicate acknowledge signal to set the TCP sending end in the persist mode.

2. The apparatus of claim 1, wherein the generated duplicate acknowledge signal includes information for setting a window size of the TCP sending end as zero.

3. The apparatus of claim 1, wherein the mode processing unit sends a received acknowledge signal of the packet to the TCP sending end when the acknowledge signal of the packet is received from the TCP receiving end during the retransmission time of the wireless section.

4. The apparatus of claim 3, wherein the mode processing unit retransmits packets to the TCP receiving end if the packets that are included in a window containing the packet of the received acknowledge signal exist in the storage unit.

5. The apparatus of claim 1, wherein the TCP sending end is a wired end, and the TCP receiving end is a mobile terminal.

6. The apparatus of claim 1, wherein the TCP processing apparatus is in a base station controller.

7. The apparatus of claim 1, wherein the persist mode prevents the TCP sending end from performing congestion avoidance and control upon packet loss in the wireless section, and wherein another mode causes the TCP sending end to perform congestion avoidance and control by said packet loss.

8. A TCP processing method of a subsystem in a wired/wireless integrated network, comprising:
processing a data packet received to the subsystem from a TCP sending end;
operating the TCP sending end in a persist mode if an acknowledge packet corresponding to the data packet is not received from a TCP receiving end during a retransmission time of a wireless section, wherein the operating the TCP sending end in the persist mode includes:
generating a duplicate acknowledge packet that has a same sequential number as a largest sequential number of the acknowledge packet received from the TCP receiving end,
setting information to indicate the persist mode in the TCP sending end in the generated duplicate acknowledge packet, and
sending the duplicate acknowledge packet to the TCP sending end.

9. The method of claim 8, wherein setting the information includes setting a window size of the TCP sending end to a predetermined value in the duplicate acknowledge packet.

10. The method of claim 8, wherein the retransmission time of the wireless section is updated on the basis of a recalculated round trip time (RTT), wherein the RTT of a wireless link is recalculated when the acknowledge packet corresponding to the data packet is received from the TCP receiving end.

11. The method of claim 8, wherein the TCP sending end is a wired end and the TCP receiving end is a mobile terminal, and wherein the subsystem is a base transceiver subsystem.

12. The method of claim 8, wherein processing the data packet comprises:
storing the data packet received from the TCP sending end in a memory;
forwarding the data packet to the TCP receiving end; and
activating an acknowledge packet timer that checks whether a retransmission time of a wireless section set on the basis of a round trip time (RTT) of the wireless link is timed out.

13. A TCP processing method in a wired/wireless integrated network, comprising:
processing a data packet received from a TCP sending end;
operating the TCP sending end in a congestion override mode if an error in transmission of the data packet to a TCP receiving end occurs in a wireless section of the network; and
deleting a corresponding data packet from a memory if an acknowledge packet is a new acknowledge packet, sending the acknowledge packet to the TCP sending end, updating a round trip time of a wireless link, and retransmitting data packets to the TCP receiving end if the data packets that are included in a window of the data packet exist in the memory when the acknowledge packet corresponding to the data packet is received from the TCP receiving end during a retransmission time of the wireless section.

14. The method of claim 13, further comprising:
checking whether the data packet corresponding to the received acknowledge packet exists in the memory if the received acknowledge packet is a normal duplicate acknowledge packet received first;
retransmitting the corresponding data packet to the TCP receiving end if the corresponding data packet exists in the memory, deleting the corresponding data packet from the memory, reactivating an acknowledge timer for checking whether the retransmission time of the wireless section is timed out, and retransmitting the data packets to the TCP receiving end if the data packets that are included in the window of the corresponding data packet exist in the memory; and
sending the normal duplicate acknowledge packet received first if the corresponding data packet does not exist in the memory.

* * * * *